United States Patent [19]

Anderson

[11] Patent Number: 5,109,609
[45] Date of Patent: May 5, 1992

[54] BALL-POINT SURFACE CHECKING DEVICE AND METHOD

[76] Inventor: Gunnar Anderson, 12750 Caravel, Cerritos, Calif. 90701

[21] Appl. No.: 561,923

[22] Filed: Aug. 2, 1990

[51] Int. Cl.⁵ .......................... G01C 25/00; G01B 3/30
[52] U.S. Cl. .................................. 33/502; 33/501.05; 33/545; 33/567
[58] Field of Search .................. 33/502, 501.05, 645, 33/545, 546, 567, 501.16, 501.08; 73/1 J

[56] References Cited

U.S. PATENT DOCUMENTS

| | | |
|---|---|---|
| 804,067 | 11/1905 | Stowe . |
| 1,306,254 | 6/1919 | Deck .................. 33/567 X |
| 2,306,469 | 12/1942 | Rupley . |
| 2,487,667 | 11/1949 | Nippert . |
| 2,718,104 | 9/1955 | Kirklin ................ 33/567 X |
| 3,315,367 | 4/1967 | Walsh et al. . |
| 3,417,475 | 12/1968 | Vlasaty . |
| 3,479,744 | 11/1969 | Howland et al. . |
| 4,373,267 | 2/1983 | Lycan ..................... 33/502 |
| 4,445,276 | 5/1984 | Voneky et al. . |
| 4,523,450 | 6/1985 | Herzog .................... 73/1 J |
| 4,523,849 | 6/1985 | Stone . |
| 4,586,266 | 5/1986 | Leumann ................ 33/531 |

FOREIGN PATENT DOCUMENTS

| | | | |
|---|---|---|---|
| 0558348 | 8/1923 | France ............. 33/501.05 |
| 0410392 | 5/1947 | Italy ................. 33/501.05 |

Primary Examiner—William A. Cuchlinski, Jr.
Assistant Examiner—C. W. Fulton
Attorney, Agent, or Firm—Fulwider, Patton, Lee & Utecht

[57] ABSTRACT

A device and method for checking the roundness of ball-point type contacts associated with a measuring device and used to engage a threaded surface of a specific thread type to facilitate measurement of critical dimensional parameters of a threaded member. The device consists of a hard, wear resistant, and dimensionally stable material having formed thereon a reference groove and a comparison groove adjacent flat surfaces. The reference groove conforms in profile to the profile of the thread type while the comparison groove is square-shouldered and wider than deep. The depths of the reference and comparison grooves are selected such that a perfectly round ball-point type contact is insertable into each to the exact same depth relative the respective adjacent surfaces. The method requires attachment of the contact to a dial gage capable of measuring the distance to which the contact extends below a reference plane. Inserting the ball-point type contact first into the reference groove, zeroing the device and then checking for any deflection of the dial when the ball-point type contact is inserted into the comparison groove enables a quantitative determination of the amount of wear to the spherical surface to be made.

7 Claims, 2 Drawing Sheets

BALL-POINT SURFACE CHECKING DEVICE AND METHOD

BACKGROUND OF THE INVENTION

1. Field of the Invention

This invention generally relates to instrument calibration aids and more particularly pertains to devices and methods for checking the roundness of spherical contact surfaces. Description of the Prior Art Spherical contact surfaces are utilized in a variety of instruments designed to precisely measure dimensions of length. Examples of such instruments include the various gages employed to measure critical dimensional parameters associated with a threaded member such as its pitch diameter, lead and taper. The use of spherical contact surfaces allows a threaded surface to be engaged within the threading itself as opposed to on its crests or in its troughs and thereby renders measurements less susceptible to error due to thread wear or contamination.

These spherical contact surfaces, commonly referred to as ball-point type contacts, are typically attached to a precision dial gage or caliper which is configured to provide a very precise and accurate measure of the absolute distance between two such contacts or perhaps between one such contact and a flat reference surface by either direct or comparative means. Despite the fact that such ball-point type contacts are typically manufactured of tungsten or tantalum carbide, they are subject to wear with use which causes the accuracy and precision of the resulting measurement to be compromised. In order to ensure that accurate and precise results are obtained, it is therefore imperative that the condition of the contact's spherical surface is checked on a regular basis.

When a spherical surface comes in contact with, for instance, a line-pipe type threading (60° V-profile), only certain areas of the ball-point type contact are subject to wear. Simply indiscriminately measuring the ball's overall diameter may therefore not reveal wear as the ball's diameter is diminished only when measured in certain orientations. Consequently it is more accurate to say that the ball's "roundness" is decreased rather than its overall diameter. Moreover, a relatively small flaw in a ball-point type contact's "roundness" can have a greatly exaggerated effect on the accuracy of a measurement as a relatively small amount of surface wear allows the ball to be inserted to a much greater depth into a V-shaped groove. The roundness of the ball-point type contact is therefore of critical importance.

Two methods are commonly employed to check the roundness of the ball-point type contacts. One calls for the use of an apparatus which optically enhances the image of the sphere or ball-point so as to facilitate visual detection of any surface irregularities. The size and complexity of the instrument in conjunction with the fact that a subjective determination is ultimately required severely compromises the utility of this method. An alternative method involves the use of a micrometer or the equivalent with which a direct diameter measurement of the ball-point is taken. Multiple measurements taken by this method along various orientations of the ball-point increase the likelihood of detecting a worn area, but this method, at best, provides only a very rough and unreliable estimate of the amount of surface wear.

In view of the above described disadvantages associated with heretofore used methods of checking the roundness of the ball-point type sphere, a compact, simple, and economical means for quickly and accurately checking the roundness of a spherical surface is called for.

SUMMARY OF THE INVENTION

The present invention provides a gage and method by which the roundness of a spherical surface can quickly be checked. The device according to the present invention employs no moving parts, is small, compact and enables a very accurate and reliable quantitative determination of the roundness of a ball-point type contact to be made in a very short period of time.

The device according to the present invention consists of a monolithic piece of hard, wear resistant, and geometrically stable material having formed thereon an extremely flat surface or surfaces having formed thereinto a number of grooves of preselected profile and depth. A first reference groove of substantially arbitrary but constant depth conforms in profile to the profile of a selected thread type. Said selected thread type coincides with the thread type which the ball-point type contact to be checked will be employed to measure. Additionally, at least one square-shouldered comparison groove, wider than deep, is formed in a flat surface of the device, the depth thereof being selected such that a perfectly round ball-point type contact of known diameter is insertable thereinto to a depth very precisely coinciding to the depth to which the same perfectly round ball-point type contact is insertable into the reference groove. Additional square-shouldered comparison grooves of different depths may be accommodated on the flat surface or surfaces. The depth of each such additional comparison groove is selected such that a ball-point type contact of a particular nominal diameter can be inserted as far thereinto as it can be inserted into the first reference groove. Each square-shouldered comparison groove is demarked with the nominal diameter of the ball-point type contact which has the appropriate fit.

In a preferred embodiment, the device of the present invention takes the form of a polyhedron, and more particularly, a cube, while the reference groove comprises a 60°−V in profile. A single square-shouldered comparison groove as described above is precision ground into each of the five other faces. Each face has inscribed therein the value of the nominal diameter of the perfectly round ball-point type contact which is insertable into the groove formed on that particular face to the same depth to which it is insertable into the 60°−V reference groove.

The method by which the device of the present invention is employed to check the roundness of ball-point type contact first requires the ball-point type contact to be appropriately attached to a precision dial gage which is capable of measuring the distance to which the attached ball-point type contact extends below the gage's reference plane. So attached, the ball-point type contact is inserted into the above-described device's reference groove selected to coincide in profile to the type of thread that particular ball-point type contact will engage when employed to measure certain parameters associated with a threaded member. The reference plane of the dial gage is firmly held against the device's surface accommodating said reference groove while the dial is zeroed. Subsequent thereto, the ball-point type contact is inserted into the square-shouldered comparison groove of the appropriate depth as related to the nominal diameter of that particular ball-point type contact, while the reference plane of the dial gage is firmly held against the flat surface adjacent thereto. Any deflection apparent on the dial is a direct indication of the amount of wear to the spherical surface, and directly provides the amount by which any measurement ultimately obtained by an instrument utilizing that particular contact must be corrected.

Other features and advantages will become apparent from the following detailed description taken in conjunction with the accompanying drawings, which illustrate by way of example, the principles of the invention.

DETAILED DESCRIPTION OF THE PREFERRED EMBODIMENT

Figure 1:
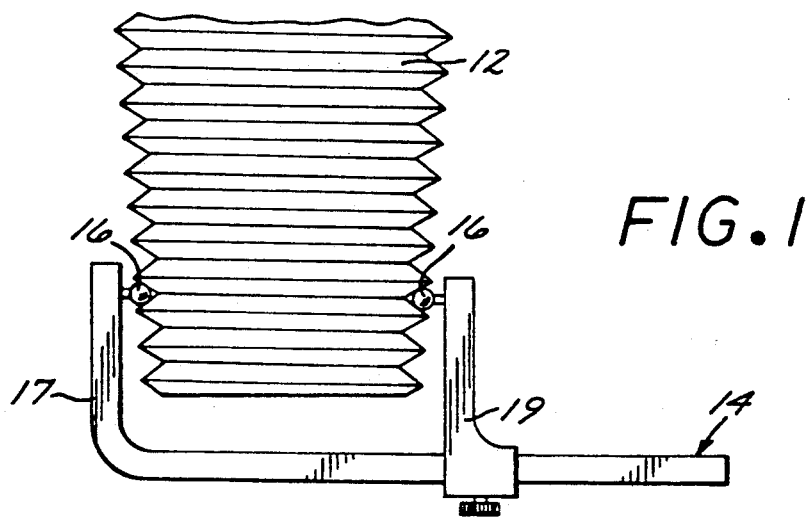
FIG. 1 is a plan view of a gage being employed to measure a critical parameter associated with a threaded member.

FIG. 1 generally illustrates an instrument being used to measure a critical parameter related to a threaded member wherein said instrument employs spherical contacting surfaces. More particularly, the ball-point type contacts 16, each attached to a reference arm 17, 19 of caliper 14 are caused to engage the threading of threaded member 12. The instrument 14 is capable of providing a precise indication of the distance between the two ball-point type contacts 16. By then referring to the appropriate tables which take into consideration the nominal diameters of the ball-point type contacts 16 as well as the threading type of said threaded member 12, the actual pitch diameter of the threaded member 12 can be determined. Other instruments employ spherical contact surfaces in a similar manner to facilitate precise measurement of certain dimensional parameters.

Figure 2:
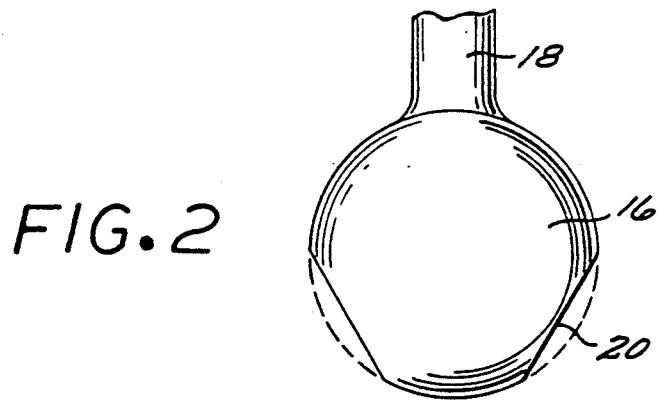
FIG. 2 is an enlarged view of a worn ball-point type contact.

Repeated use of instrument 14 causes the ball-point type contacts 16 to wear in those areas that actually engage the threads. FIG. 2 is an enlarged illustration of such a ball-point type contact 16 which has undergone wear 20 due to repeated contact with a V-shaped groove. An instrument only capable of providing a measure of the distance between the centers of two such ball-point type contacts or the distance between the points of closest approach between two such ball-point type contacts would, as a result of the wear 20 shown, no longer be able to provide an accurate measure of the threaded member's pitch diameter.

FIG. 2 additionally shows stud 18 extending from ball-point type contact 16. Stud 18 serves to interconnect instrument 14 with contact 16. The stud 18 can be either be permanently affixed to contact 16 and threadably engagable to instrument 14, or alternatively, the stud 18 can be permanently affixed to instrument 14 and formed to threadably engage contact 16 via an internally threaded hole within the contact's interior. As apparent in FIG. 2, the effective diameter of the ball-point type contact 16 is reduced in only certain orientations, while direct diameter measurements taken along other orientations may show absolutely no decrease. A ball worn as shown in FIG. 2 can have a significant effect on the accuracy and precision of a measurement provided by instrument 14.

Figure 3:
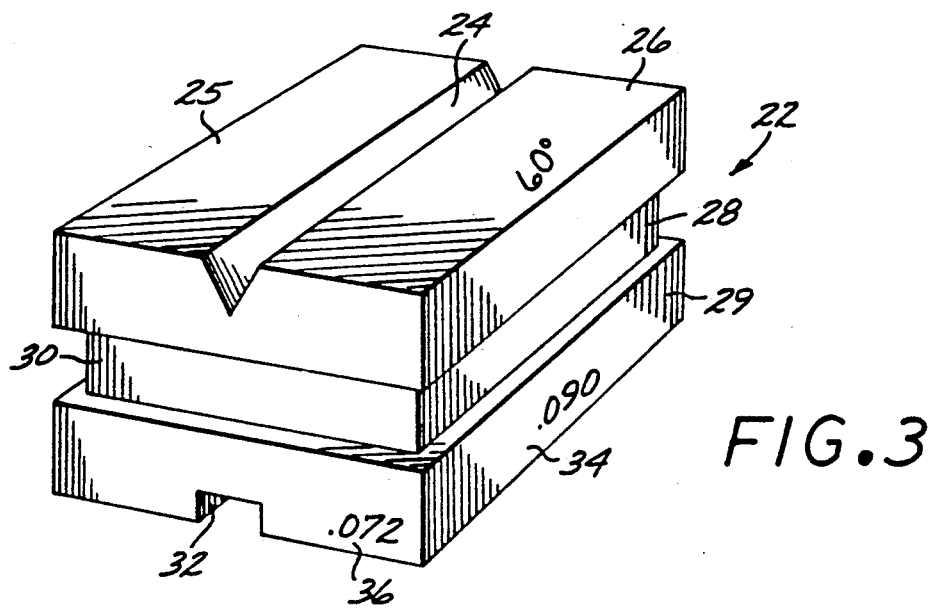
FIG. 3 is a perspective view of an embodiment of the present invention.

FIG. 3 is a perspective view of a preferred embodiment of the present invention. The device generally consists of regular cube 22 having six very flat faces, each with a groove formed therein. Reference groove 24 conforms in profile to the profile of a preselected thread type. In the illustration of FIG. 3 such a thread type is a common line-pipe thread forming a 60°−V in profile. The demarcation 26 appearing on the face of cube 22 accommodating groove 24 serves to readily identify that particular groove's profile type. Additional grooves 28, 30 and 32 are shown each accommodated on a different face of cube 22. Two additional grooves are accommodated on the faces not visible in the illustration. Each such groove serves as a comparison groove, is of constant depth and is wider than it is deep. The depth of a comparison groove is selected such that a perfectly round sphere of preselected nominal diameter is insertable therein to a depth exactly equal to the depth to which it is insertable in the reference V groove 24.

Each face accommodating a square-shoulder comparison groove has an identifying inscription thereon relating to the depth of such groove. In the case of groove 28 on face 29, the demarcation "0.090" at 34 refers to the diameter of a perfectly round sphere (0.090 inches) which is insertable into reference groove 24, as measured relative to face 25, exactly as far as it is insertable into comparison groove 28 as measured relative to face 29.

In the case of a 60°−V reference groove, the depth of the reference groove 24 less ½ the nominal diameter of a selected sphere yields the required depth of the various comparison grooves.

EXAMPLE

For a 60°−V groove, 0.088253" in depth:

| NOMINAL BALL DIAMETER | DEPTH OF GROOVE |
|---|---|
| .057" | .059753" |
| .062" | .057253" |
| .072" | .052253" |
| .090" | .043253" |

The cube of the present invention is preferably constructed of a hard, abrasion resistant, and geometrically stable material. In the preferred embodiment, the device is machined from a solid piece of stainless steel, the depth of each groove being machined to 0.0001" tolerances.

Figure 4:
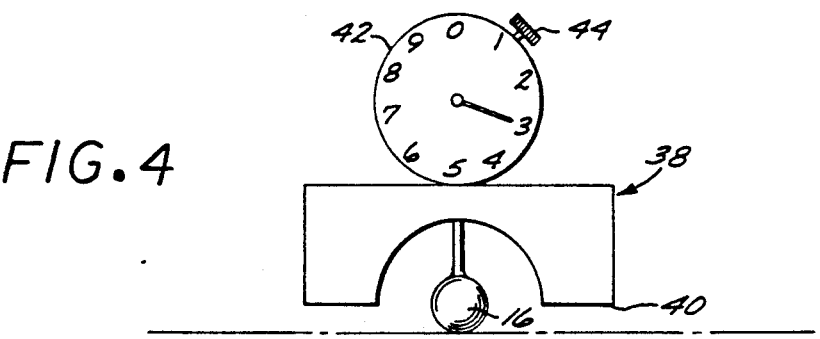
FIG. 4 is a schematic representation of a ball-point type contact attached to an appropriate dial gage.

In use, the ball-point type contact 16 to be checked is attached to a dial gage 38 such as the one illustrated in FIG. 4. The gage is capable of providing a precise indication of the distance the attached contact 16 protrudes beyond the gage's reference plane 40 as readable on dial gage 42. Knob 44 allows dial 42 to be zeroed at any position of the ball-point type contact 16. Once the contact 16 is appropriately attached to gage 38, ball-point type contact 16 is inserted into reference groove 24 while the reference plane 40 of the gage 38 is firmly held against face 25 of the cube 22. Dial 42 is zeroed while in this position. Subsequent thereto, the contact 16 is inserted into the groove on the face of the cube demarked with the ball's nominal diameter and the gage's reference plane 40 is firmly held against the adjacent face. Any deflection of dial 22 is an indication of wear. Moreover, such a reading will also provide a correction factor with which a measured value obtained by an instrument utilizing that contact must be corrected so as to provide a precise and accurate measurement.

Figure 5:
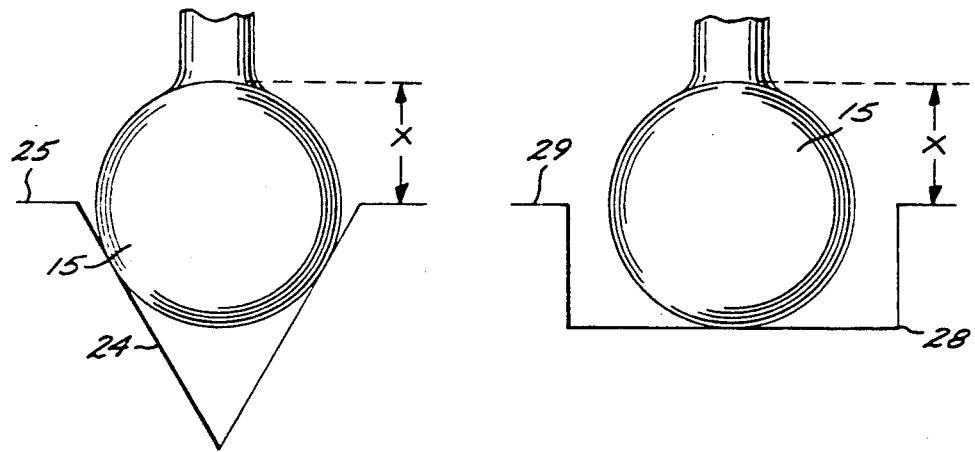
FIG. 5 is enlarged plan view illustrating a perfectly round ball-point type contact interacting with an embodiment of the present invention.

FIG. 5 schematically illustrates how the depth selected for the reference 24 and comparison grooves 28 in the embodiment of the present invention must be selected such that the ball 15 of perfect roundness fits into the comparison groove 24 precisely as far as it fits into the reference groove 25.

Figure 6:
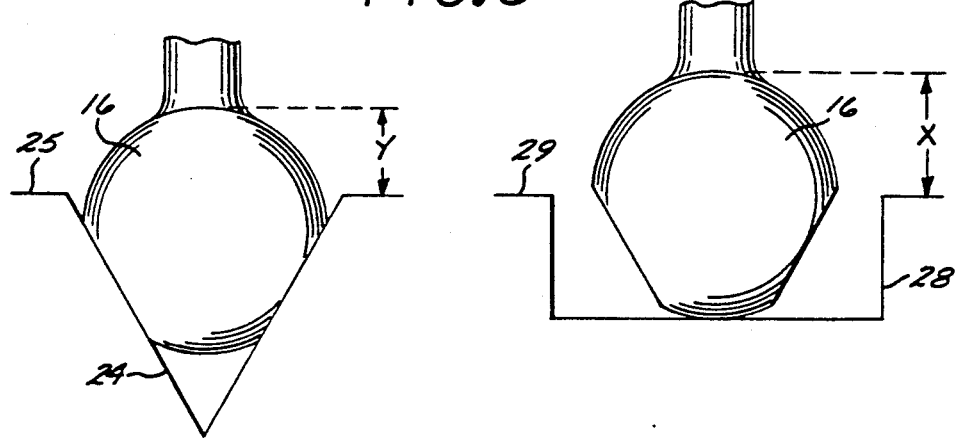
FIG. 6 is enlarged plan view illustrating a worn ball-point type contact interacting with an embodiment of the present invention.

FIG. 6 illustrates how a worn ball 16 fits into reference groove 24 to a much greater depth than it fits into the comparison groove 28. The difference between x and y provides an indication of the amount of wear and additionally provides the correction factor that must be applied to compensate for that amount of wear on that ball when measuring that particular type of threading.

While a particular form of the invention has been illustrated and described, it will also be apparent to those skilled in the art that various modifications can be made without departing form the spirit and scope of the invention. Accordingly it is not intended the invention be limited except as by the appended claims.

What is claimed is:

1. A device for checking the roundness of a ball-point type contact attachable to an instrument capable of measuring dimensional parameters associated with a threaded member wherein said ball-point type contact is employed to engage a predefined thread type on the surface of the threaded member, comprising:
    a monolithic piece of hard, wear resistant, and geometrically stable material, having formed thereon at least one flat surface which has formed therein a reference groove of constant depth conforming in profile to the thread type of said threaded surface and additionally, having formed therein a comparison groove of constant depth, said comparison groove having a flat bottom surface, its width exceeding its depth and its depth selected such that a perfectly round ball-point type contact is insertable therein to a depth below the surface adjacent thereto exactly as far as such perfectly round ball-point type contact is insertable into said reference groove relative the surface adjacent thereto.

2. The device of claim 1 wherein said monolithic piece comprises a polyhedron and wherein said reference groove and said comparison groove are formed on different faces of said polyhedron.

3. The device of claim 2 wherein said polyhedron comprises a cube.

4. The device of claim 1 wherein said preselected thread type is line-pipe threading and said reference groove defines a 60°−V in profile.

5. The device of claim 4 wherein said comparison groove's depth is selected to e "V−d/2", wherein "V" comprises the depth of the reference groove while "d" comprises the nominal diameter of the ball-point type contact.

6. A device for checking the roundness of ball-point type contacts that are attachable to an instrument capable of measuring dimensional parameters associated with a threaded member wherein said ball-point type contacts are employed to engage a predefined thread type on the surface of the threaded member, comprising:
    a monolithic cube of hard, wear resistant, and geometrically stable material, having formed in one face a reference groove of constant depth conforming in profile to the thread type of said threaded surface and additionally, having formed in each of the other five faces a comparison groove of constant depth, each comparison groove having a flat bottom surface, its width exceeding its depth, each groove of a different depth selected such that a perfectly round ball-point type contact of a different preselected nominal diameter is insertable therein to a depth below the surface adjacent thereto exactly as far as such perfectly round ball-point type contact is insertable into said reference groove relative the surface adjacent thereto.

7. A method for checking the wear of a ball-point type contact attachable to an instrument capable of measuring dimensional parameters associated with a threaded member wherein said ball-point type contact is employed to engage a predefined thread type on the surface of the threaded member, comprising the steps of:
    attaching said ball-point type contact to dial gage having a reference plane and capable of measuring the distance to which said attached ball-point type contact protrudes below said reference plane;
    inserting said attached ball-point type contact into a reference groove formed on a calibration device, said calibration device being formed of hard, wear resistant, and geometrically stable material having formed thereon a first flat surface which has formed therein said reference groove of constant depth and conforming in profile to the profile of said thread type;
    positioning the reference plane of said dial gage firmly against said first flat surface of said calibration device; zeroing the dial gage;
    inserting said attached ball-point type contact into a comparison groove formed on a second flat surface of said calibration device, said comparison groove having a flat bottom, its width exceeding its depth and its depth selected such that said ball-point type contact, if perfectly round, is insertable therein to the same depth it is insertable into said reference groove;
    positioning the reference plane of said dial gage firmly against said second flat surface of said calibration device; and
    reading the dial gage, whereby a non-zero reading is directly indicative of the amount of wear to the ball-point type contact.

* * * * *